US011747084B2

(12) United States Patent
Guillet et al.

(10) Patent No.: US 11,747,084 B2
(45) Date of Patent: Sep. 5, 2023

(54) SELF-CRUCIBLE WALL SUBMERGED BURNER FURNACE

(71) Applicant: SAINT-GOBAIN ISOVER, Courbevoie (FR)

(72) Inventors: Antoine Guillet, Paris (FR); Frédéric Lopepe, Rosny sous Bois (FR); Richard Di Caro, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 225 days.

(21) Appl. No.: 16/955,594

(22) PCT Filed: Dec. 12, 2018

(86) PCT No.: PCT/FR2018/053238
§ 371 (c)(1),
(2) Date: Jun. 18, 2020

(87) PCT Pub. No.: WO2019/122614
PCT Pub. Date: Jun. 27, 2019

(65) Prior Publication Data
US 2020/0340746 A1 Oct. 29, 2020

(30) Foreign Application Priority Data

Dec. 21, 2017 (FR) ...................................... 1762854
Jul. 30, 2018 (FR) ...................................... 1857089

(51) Int. Cl.
*F27B 3/16* (2006.01)
*C03B 5/235* (2006.01)
*C03B 5/43* (2006.01)
*F27B 3/12* (2006.01)

(52) U.S. Cl.
CPC .............. *F27B 3/16* (2013.01); *C03B 5/2356* (2013.01); *C03B 5/43* (2013.01); *C03B 2211/70* (2013.01); *F27B 2003/125* (2013.01)

(58) Field of Classification Search
None
See application file for complete search history.

(56) References Cited

U.S. PATENT DOCUMENTS 3,640,517 A * 2/1972 Sendt ........................ C03B 7/06
165/47
4,049,384 A * 9/1977 Wenckus ................ C30B 15/10
117/223
4,275,258 A 6/1981 Harmsen et al.
(Continued)

FOREIGN PATENT DOCUMENTS

FR 2 428 220 A1 1/1980
WO WO 2013/186480 A1 12/2013

OTHER PUBLICATIONS

International Search Report as issued in International Patent Application No. PCT/FR2018/053238, dated Feb. 18, 2019.

*Primary Examiner* — Jodi C Franklin
(74) *Attorney, Agent, or Firm* — Pillsbury Winthrop Shaw Pittman LLP

(57) ABSTRACT

A furnace for melting vitrifiable material, in particular glass, employs a submerged burner, the furnace including a wall cooled by a cooling fluid, the face of the wall facing toward the interior of the furnace having, before vitrifiable material is melted in the furnace, an attachment texture for so-called self-crucible devitrified vitrifiable material.

16 Claims, 4 Drawing Sheets

(56) References Cited

U.S. PATENT DOCUMENTS

Figure 1:

| | | | | |
|---|---|---|---|---|
| 4,279,407 A * | 7/1981 | Elsner | F27B 3/16 | 266/193 |
| 4,471,488 A * | 9/1984 | Reboux | H05B 6/22 | 373/153 |
| 6,058,741 A * | 5/2000 | Sobolev | C03B 5/26 | 65/335 |
| 6,563,855 B1 * | 5/2003 | Nishi | F27D 1/12 | 373/76 |
| 6,817,212 B1 * | 11/2004 | Romer | H05B 6/24 | 65/346 |
| 6,889,527 B1 * | 5/2005 | Romer | C03B 5/26 | 65/327 |
| 8,530,804 B2 * | 9/2013 | Koi | C03B 5/021 | 65/374.13 |
| 9,902,639 B2 * | 2/2018 | Mobley | C03B 5/26 | |
| 10,670,261 B2 * | 6/2020 | Baker | B23H 1/00 | |
| 10,807,896 B2 * | 10/2020 | Wang | C03B 5/44 | |
| 2002/0162358 A1 * | 11/2002 | Jeanvoine | C03B 5/2356 | 65/135.1 |
| 2009/0176639 A1 * | 7/2009 | Jacques | C03C 8/02 | 65/335 |
| 2010/0218558 A1 * | 9/2010 | Gross | C03B 5/03 | 65/135.6 |
| 2011/0011849 A1 * | 1/2011 | Koi | C03B 5/42 | 219/602 |
| 2011/0236846 A1 * | 9/2011 | Rue | F27B 3/205 | 432/195 |
| 2011/0243180 A1 * | 10/2011 | Koi | C03B 5/42 | 373/142 |
| 2013/0327092 A1 | 12/2013 | Charbonneau | | |
| 2014/0007622 A1 * | 1/2014 | Shock | C03B 5/20 | 65/335 |
| 2015/0175464 A1 * | 6/2015 | Lefrere | C03B 5/265 | 65/135.1 |
| 2015/0336834 A1 * | 11/2015 | Mobley | C03B 5/44 | 65/347 |
| 2015/0353405 A1 * | 12/2015 | Gullinkala | C03B 5/2356 | 65/135.1 |
| 2016/0002084 A1 | 1/2016 | Charbonneau | | |
| 2016/0168001 A1 * | 6/2016 | Demott | C03B 5/44 | 432/13 |
| 2017/0203989 A1 | 7/2017 | Shock et al. | | |
| 2018/0058688 A1 * | 3/2018 | Faulkinbury | F23D 14/78 | |
| 2018/0105446 A1 * | 4/2018 | Faulkinbury | C03B 5/2356 | |
| 2018/0345401 A1 * | 12/2018 | Giaramita | F27D 1/141 | |
| 2018/0347905 A1 * | 12/2018 | Jastrzebski | F27D 9/00 | |
| 2021/0094863 A1 * | 4/2021 | Rashley | C03B 5/44 | |
| 2022/0098078 A1 * | 3/2022 | Rashley | C03B 5/2356 | |

* cited by examiner

Fig.5
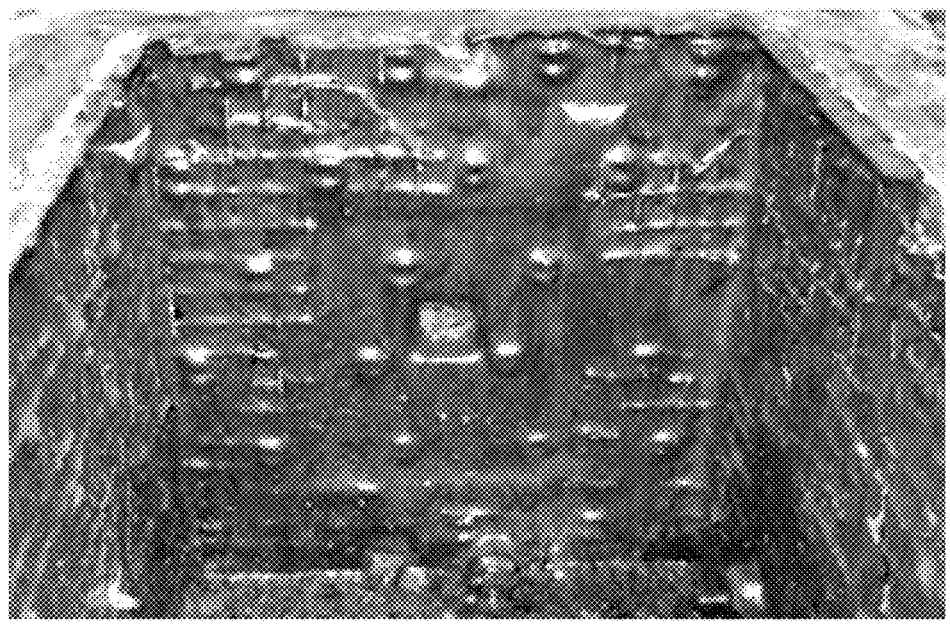
Fig.6
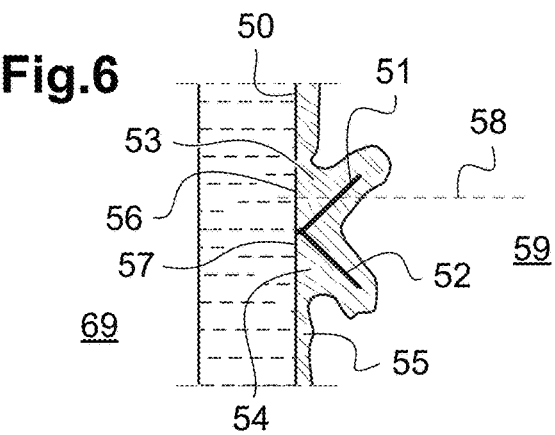
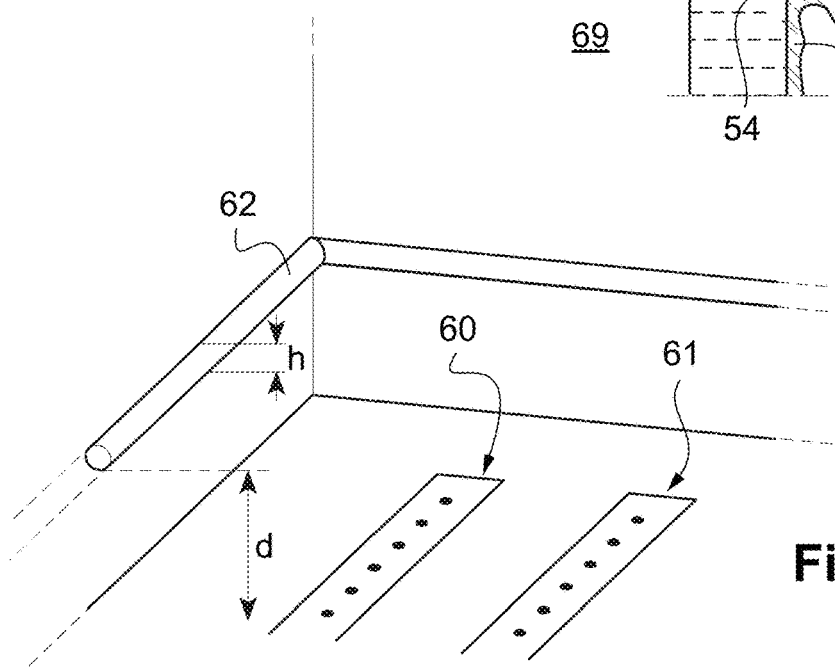
Fig.7

SELF-CRUCIBLE WALL SUBMERGED BURNER FURNACE

CROSS-REFERENCE TO RELATED APPLICATIONS

This application is the U.S. National Stage of PCT/FR2018/053238, filed Dec. 12, 2018, which in turn claims priority to French patent application number 1762854 filed Dec. 21, 2017 and French patent application number 1857089 filed Jul. 30, 2018. The content of these applications are incorporated herein by reference in their entireties.

The invention concerns the field of submerged burner furnaces with metal walls cooled by a cooling fluid, a wall of this kind usually being referred to by the person skilled in the art as a water-jacket. These furnaces are intended for melting a vitrifiable material, generally of the oxide type, generally containing at least 30% by weight of silica, such as a glass or a silicate such as an alkaline and/or alkaline-earth silicate. The glass may in particular be soda lime glass or rock often referred to by the person skilled in the art as "black glass".

A water-jacket cooling system is used for a submerged burner furnace in order to contain the temperature to which its structure is exposed. The molten vitrifiable material, which may in particular be molten glass, in contact with these cooled (T° C.<100° C.) walls is devitrified (i.e. solidified) and forms a solid crust between the mass of vitrifiable material and the metal wall. This devitrified vitrifiable material crust provides natural protection of the walls. It is perfectly compatible with the vitrifiable material being melted since it has the same composition, solidified. This crust therefore forms a "self-crucible" for the vitrifiable material in the furnace. However, it is found that this self-crucible cracks, fragments and falls off in sheets during operation. Even if the eliminated self-crucible zone is reconstituted in contact with vitrifiable material, the corresponding wall metal surface has nevertheless been exposed for some time to erosion/corrosion by the very hot molten vitrifiable material and moreover a very intense exchange of heat between the molten vitrifiable material, in particular the molten glass, and the cooled wall occurs locally for as long as the self-crucible has not been reconstituted. Also, the solid self-crucible sheets that have fallen into the molten material are remelted, which also absorbs energy uselessly and causes the temperature of the molten mass to fall. All these unpredictable transfers of heat destabilize the melting process.

It has been estimated that the poor retention of the self-crucible on the wall is linked to the chemical and physical nature of that wall, notably the fact that it is too smooth, as well as to the high thermal stresses to which it is subjected. Also, it has been realized that the self-crucible had a badly formed structure at its interface with the metal wall because of the rapid solidification of the vitrifiable material. The face of the self-crucible in contact with the metal espouses the latter very imperfectly, is porous and contains real ducts. The molten material is continuously and powerfully projected against the walls because of the high levels of agitation caused by the submerged combustion. These projections exert a high pressure on the combustion gases and it has been found that combustion gas passes between the self-crucible and the metal wall to exit the self-crucible alongside the vitrifiable material at a particular height from the bottom of the tank, that height being random and possibly even reaching the level of the vault. Here the expression "combustion gas" covers the gases formed following combustion and/or unburnt fuel and/or oxidizer. Analysis of these combustion gases has shown that they contain a great deal of water, which is particularly corrosive for the metal of the wall. Also, the unburnt gases leaving the self-crucible at a particular height burn as soon as they leave the self-crucible but transfer less energy to the vitrifiable material being melted than if they had burned at the bottom of the tank as normally happens.

The invention concerns a submerged burner vitrifiable material (in particular glass) melting furnace including a wall cooled by a cooling fluid, the face of the wall facing toward the interior of the furnace having, before melting vitrifiable material in the furnace, an attachment texture for so-called self-crucible devitrified vitrifiable material, to cover the interior wall of the furnace as soon as it starts operating to melt vitrifiable material. The invention procures in particular the following advantages:

stabilization of the self-crucible layer of the furnace;
stabilization of the melting process;
stabilization and minimization of the transfers of heat and therefore improvement of the energy efficiency;
diversion of the unburnt gases toward the pool of vitrifiable material and minimization of the unburnt gases passing between the metal wall and the self-crucible;
reduction of the corrosion of the metal wall and extension of its surface life.

The solution described in the present application is moreover of relatively low cost, flexible and easy to implement.

The wall is generally vertical but may also be inclined. Overall, the wall makes the connection between the hearth and the vault of the furnace. The wall enables the furnace, with the hearth, to contain the vitrifiable material melted in the furnace.

The attachment texture comprises solids and voids preferably of at least 5 mm perpendicular to the wall. This means that if a smooth surface is placed against the textured surface and parallel to the wall, said smooth surface being constituted of generatrices parallel to one another (those generatrices are vertical if the wall is vertical), the space between the wall and said smooth surface contains recesses of at least 5 mm and preferably of at least 1 cm and preferably of at least 2 cm. There may even be placed in these recesses a virtual sphere of at least 5 mm diameter and preferably at least 1 cm diameter and preferably at least 2 cm diameter. The attachment texture is visible to the naked eye. A smooth and plane metal plate is considered not to have an attachment texture.

The wall generally comprises a metal plate, if necessary vertical if the wall is vertical, the attachment texture being produced by an attachment system comprising projecting metal elements fixed to the face of said plate facing toward the interior of the furnace. Initially the metal plate is generally smooth and has no particular relief and it is the attachment system according to the invention fixed to this plate that creates the texture. The other face of the metal plate (facing toward the exterior of the furnace) is cooled, in particular is in contact with the cooling fluid, which is generally cold water, i.e. water at a temperature generally in the range from 1 to 20° C. inclusive (temperature at the inlet of the cooling duct).

The vitrifiable materials being melted in the furnace are generally at a temperature between 800° C. and 1590° C. inclusive.

The elements texturizing the wall may notable comprise metal sections such as solid round rod, angle iron, (tubular or solid) metal square bar etc. The metal profile is preferably fixed to the metal plate so that the main direction in which it extends (its main direction perpendicular to its section) is substantially horizontal. In particular, in the case of an angle iron, the latter is advantageously fixed via its exterior edge. That exterior edge forms an obtuse angle at the meeting point of the two flat metal wings of the angle iron. The angle iron is advantageously fixed so that this edge is substantially horizontal. The metal profile may generally be fixed to the metal plate by welding it thereto.

The elements texturizing the wall may equally be localized elements (in particular with no greater extent in a particular direction parallel to the wall) fixed to the wall, such as studs inserted in the plate or welded to the plate.

The texture advantageously comprises projecting elements forming locally in the wall spaces that can be filled by the devitrified vitrifiable material of the self-crucible, that devitrified vitrifiable material being trapped in these spaces between at least part of a projecting element and the surface of the wall situated farther toward the periphery of the furnace (i.e. farther toward the exterior of the furnace) than the projecting element part.

The texturizing elements are preferably fixed to the plate of the metal wall to project therefrom, projecting from the metal plate to a depth of at least 1 cm and preferably at least 2 cm from the plate.

Moreover the texturizing elements act effectively to prevent the gas flowing along the metal wall and under the self-crucible rising to some distance from the bottom of the furnace. To this end, a texturizing element, in particular of the profile type, is advantageously positioned toward the bottom of the furnace and extend substantially horizontally around the furnace. This is advantageously a profile the extension direction of which is substantially horizontal (a localized element on the surface of the wall, of the peg type, is not preferred for this barrier function). This texturizing element belt in fact forms a combustion gas diverting barrier so that much less combustion gas passes under the self-crucible above this barrier. These texturizing elements, forming if necessary a complete belt on the interior perimeter of the metal wall, are preferably at a distance from the lowest point of the hearth between 5 cm and 20 cm. Installing this diversion barrier therefore forces the gases to return to the molten bath, which has two consequences: 1) the unburnt gases burn in the vitrifiable material, 2) water no longer runs along the metal wall, corrosion of which is thereby reduced. Thus the texture according to the invention may include a substantially horizontal belt projecting to a distance from the lowest point of the hearth (outside the self-crucible on the hearth) between 5 cm and 20 cm inclusive. This lowest point of the hearth is that in contact with vitrifiable materials before the formation of the self-crucible. Note in fact that the self-crucible may equally be formed on the hearth.

In order to reduce further the corrosion of the metal in the wall by the molten vitrifiable material, in particular the molten glass, the wall, including its texturizing elements, may be covered with refractory concrete, preferably concrete containing alumina. The concrete covers the wall to form an interface with the self-crucible. The concrete procures chemical attachment to the self-crucible. In fact, the alumina migrates into the vitrifiable material of the self-crucible, which may notably be glass, which leads to the devitrification temperature of this vitrifiable material increasing, and consequently very strong chemical attachment of the self-crucible. In particular, the concrete contains more than 50% and preferably more than 80% alumina. Suitable concretes are sold under the product reference 6P or F15R by Thermbond, T96HT or T95G3 by Calderys, Erplast 20 or Ersol 50 cast by Sefpro. The concrete may be applied to a substantially uniform thickness, including on the texturizing elements, so that the surface facing toward the interior of the furnace retains a texture because of the presence of texturizing elements applied beforehand to the metal wall. The presence of these texturizing elements contributes to the retention of the concrete on the wall. The surface of the concrete facing toward the interior of the furnace preferably has a texture because of the presence of the texturizing elements applied beforehand to the metal wall. Insufficient concrete is generally applied to smooth the surface of the concrete facing toward the interior of the furnace. In fact, it is preferable to retain the texture on the surface of the concrete that has an interface with the self-crucible. The layer of concrete may have a thickness in the range from 5 to 70 mm inclusive.

It is possible to produce a furnace wall conforming to the invention one face of which faces toward the interior of the furnace and the other face of which is cooled, in particular by being in contact with a cooling fluid, by fixing, in particular by welding, texturizing, in particular metal, elements onto a smooth face of a metal plate, said face then provided with said texturizing elements being intended to face toward the interior of the furnace and being covered with self-crucible when the furnace begins to operate. The invention also concerns a method of producing the furnace according to the invention including the fixing of texturizing elements to the smooth face of the metal plate and then positioning the plate, if necessary vertically, so that the face provided with the texturizing elements forms the interior face of a wall of the furnace.

The invention also concerns a method of producing a vitrifiable material, in particular glass, including melting the vitrifiable material in the furnace according to the invention. Raw materials are introduced into the furnace and are then melted in the furnace to produce the molten vitrifiable material, the latter then being extracted from the furnace by flowing through an orifice.

FIG. 1 represents the interior of a submerged burner furnace with water-jacket type metal walls according to the prior art after shutting it down. The metal walls were smooth before the furnace began to operate, i.e. were constituted of steel plate with no particular texture. It is seen that a layer of devitrified glass adhering to the wall has detached in sheets and at random to fall onto the hearth.

Figure 2:
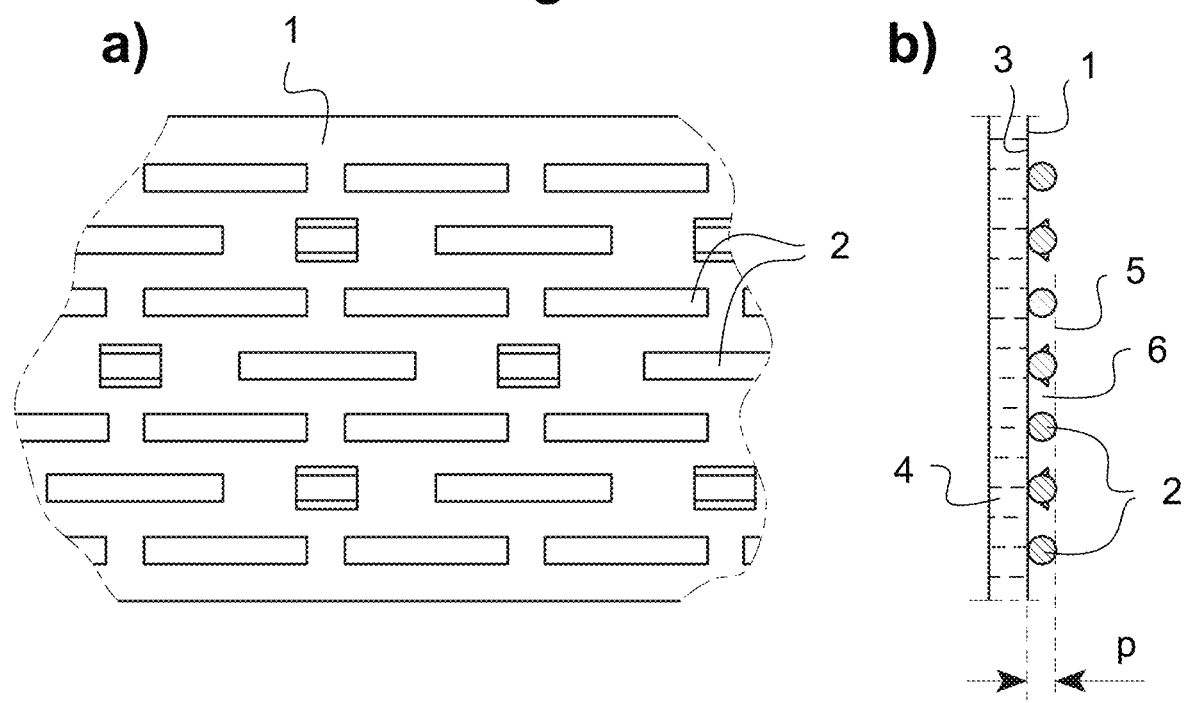

FIG. 2 represents the wall of a furnace according to the invention seen from the interior at a) and in section at b). The vertical and initially smooth metal plate 1 of the wall is covered with metal elements 2 fixed to said plate. These metal elements are of the profile type and are fixed to the plate by welding them to it. They are fixed so that the main direction in which they extend is substantially horizontal. They form an attached texture comprising solids and voids of value p (at least 5 mm) perpendicular to the surface of the metal plate 1. In fact, if a smooth surface 5 parallel to the wall is placed against the textured surface, said smooth surface being constituted of vertical generatices parallel to one another, the space between the wall and said smooth surface contains recesses 6 of at least 5 mm perpendicularly to the wall (the depth p is considered perpendicular to the wall). The other face 3 of the metal plate 1 is in contact with the cooling water 4.

Figure 3:
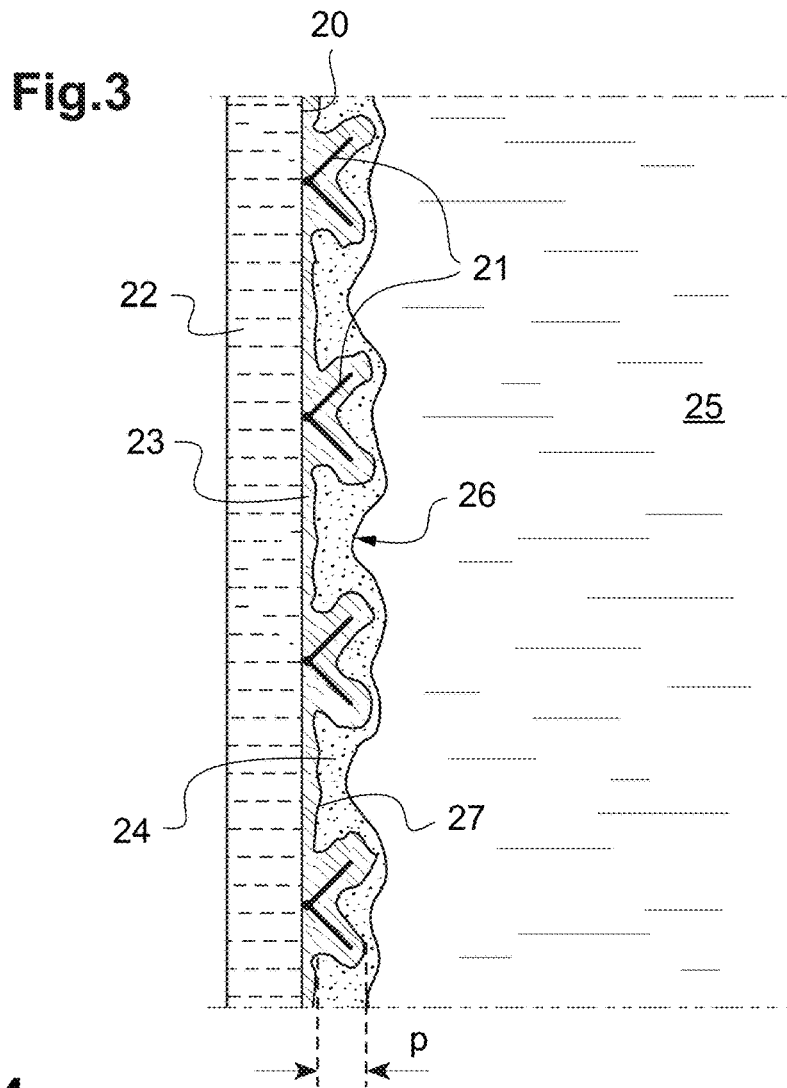

FIG. 3 represents the wall of a furnace according to the invention, seen in section. The initially smooth vertical metal plate 20 of the wall is covered with metal elements 21 fixed to said plate. These metal elements are of the angle iron profile type and are fixed to the plate by welding their exterior edge joining the two flat wings of the angle iron. They are fixed so that the main direction in which they extend is substantially horizontal. The other face of the metal plate 20 is in contact with cooling water 22. A refractory concrete 23 has been applied to the metal wall after fixing on the angle iron 21. That concrete therefore covers the angle irons 21 on the interior face of the plate 20. Before the furnace is operated, the surface 27 of the interior wall of the furnace therefore features recesses and solids of depth p measured perpendicularly to the wall. The devitrified vitrifiable material self-crucible 24 comes to stick to the concrete and forms a new contact surface 26 for the materials 25 being melted. The depth of the solids and recesses of the surface 26 of the self-crucible is generally less than that of the surfaces 27 of the wall (here of concrete) before melting vitrifiable material.

Figure 4:
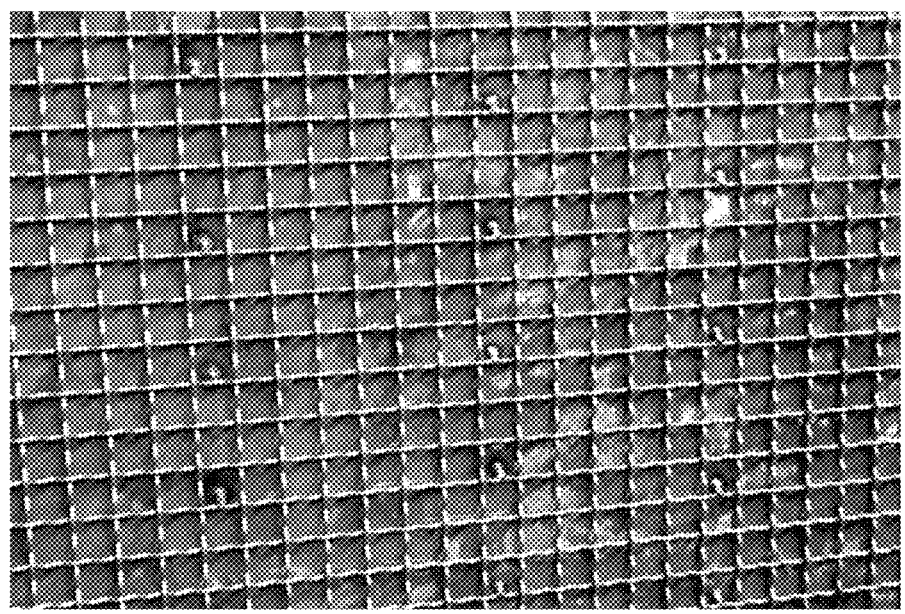

FIG. 4 represents the interior wall of a submerged burner furnace before any melting of its vitrifiable material in the furnace. A metal grid forming an attachment texture for the self-crucible has been welded to the metal plate behind which the cooling water circulates.

FIG. 5 represents the interior wall of the submerged burner furnace from FIG. 4 after melting glass in the furnace and draining the furnace. There is seen the surface of the self-crucible and the metal grid is discerned under the devitrified glass. It is found that the devitrified glass has filled much of the space between the metal grid and the metal plate.

FIG. 6 represents the wall of the furnace according to the invention, seen in section. An angle iron type profile (51, 52) has been fixed to a smooth vertical metal plate 50 forming the wall of the furnace. That angle iron comprises two flat wings 51 and 52 connected to one another in an orthogonal manner. The angle iron has been welded to the interior face of the smooth metal plate by its exterior edge forming an obtuse angle. The angle iron has been fixed so that the direction in which it extends is horizontal. The flat wings of the angle iron are projecting elements forming locally in the wall spaces 53, 54 that can be filled by devitrified vitrifiable material 55 of the self-crucible, that devitrified vitrifiable material being trapped in these spaces 53, 54 between at least the projecting flat wings and the wall surface 56, 57 situated farther toward the exterior of the furnace than the projecting flat wings 51, 52. Thus, along the straight line 58 starting from the interior of the furnace 59 and passing through the flat wing 51, the self-crucible 53 is indeed then afterward trapped between the flat wing 51 and the surface zone 56 of the (originally smooth) plate situated farther toward the periphery of the furnace, in the direction of the exterior of the furnace 69.

FIG. 7 represents in perspective a lower corner of the interior of the submerged burner furnace. The submerged burners 60 and 61 are disposed on the hearth of the furnace. A metal profile belt 62 extends all around the tank of the furnace. This belt is at a distance d (generally from 5 to 20 cm) from the deepest point of the hearth. This belt forms a barrier for the gases passing under the self-crucible between the hearth and the belt. This belt itself has a height h generally in the range from 5 to 50 mm inclusive.

Figure 8:
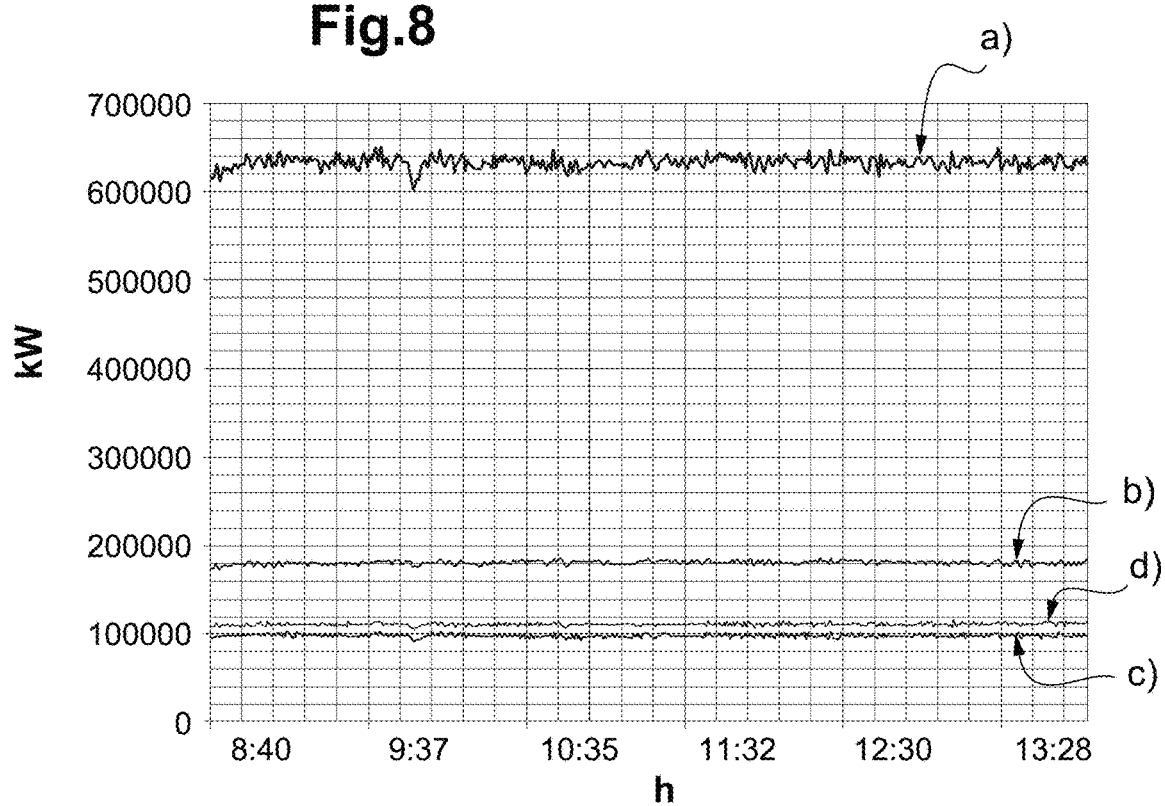

FIG. 8 represents the evolution of the energy flows with time in a submerged burner furnace according to the invention the interior wall of which is textured as shown in FIG. 2. The following energy loss flows can be measured based on measurements of the temperature of the various coolant circuits cooling various locations in the furnace:
a): total flow
b): vault and chimney
c): righthand wall
d): lefthand wall The flows are very regular and constant over time.

Figure 9:
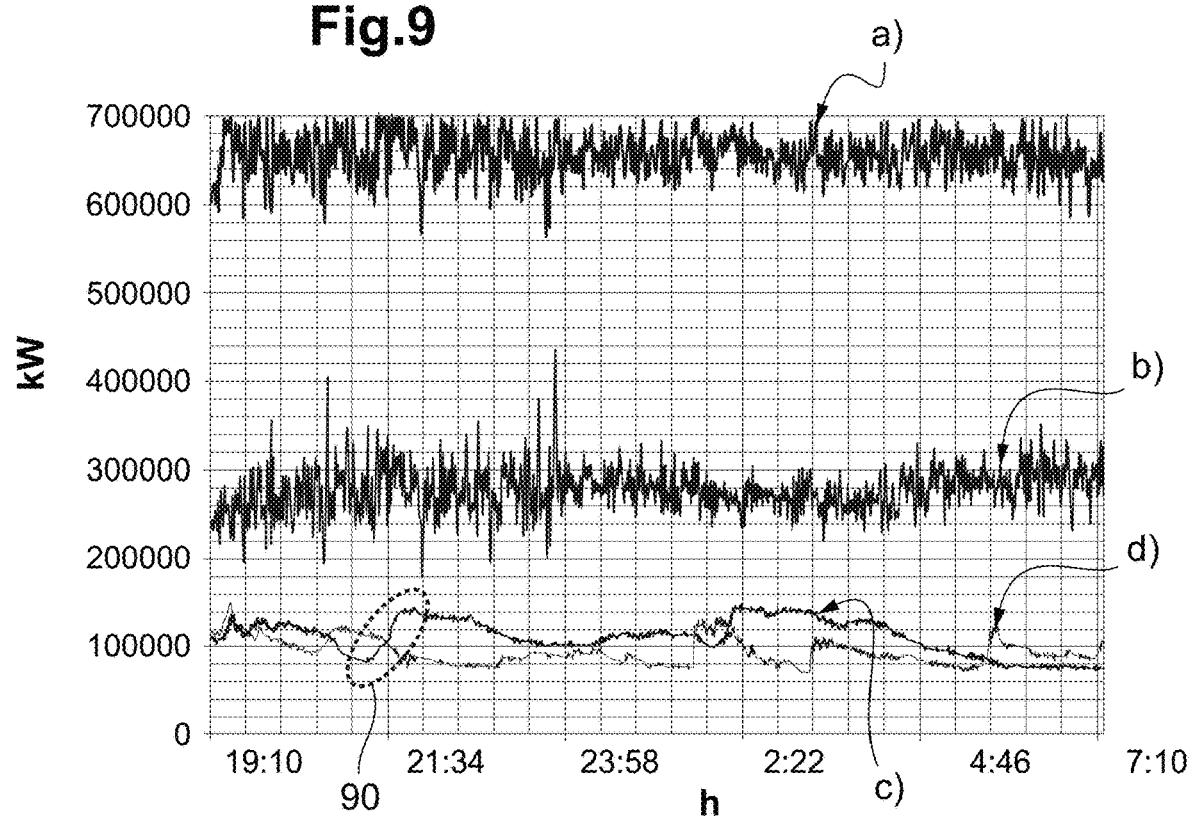

FIG. 9 represents the evolution of the energy flows with time in a submerged burner furnace identical to that corresponding to FIG. 3 except that the interior wall was a smooth metal plate with no texture. It is seen that the flows are much more irregular than in the case of the furnace from FIG. 8. In particular, when a self-crucible sheet is detached is seen very clearly since the flow curve of the wall affected by that detachment is then marked by a sudden rise, as at 90 in particular.

The invention claimed is:

1. A submerged burner vitrifiable material melting furnace including a wall cooled by a cooling fluid, wherein a face of the wall facing toward the interior of the furnace comprises an attachment texture to attach a self-crucible devitrified vitrifiable material,
wherein the wall includes a metal plate, the attachment texture comprising a plurality of separate projecting metal elements fixed to a face of said metal plate facing toward the interior of the furnace, each of said plurality of separate projecting metal elements fixed to the face of said metal plate projecting away from said face of the metal plate toward the interior of the furnace so that the attachment texture comprises solids and voids of at least 5 mm in a direction perpendicular to the wall, and
wherein said plurality of separate projecting metal elements extend longitudinally along a surface of said wall.

2. The furnace as claimed in claim 1, wherein the plurality of separate projecting metal elements comprise a metal profile.

3. The furnace as claimed in claim 2, wherein the metal profile is fixed to said metal plate so that a main direction in which the metal profile extends is horizontal.

4. The furnace as claimed in claim 1, wherein the metal profile is an angle iron.

5. The furnace as claimed in claim 4, wherein the angle iron comprises two flat wings, wherein the angle iron is fixed to the metal plate by its exterior edge at the junction of its two flat wings.

6. The furnace as claimed in claim 1, wherein a wall space is formed between at least one of the plurality of separate projecting metal elements and the face of the metal plate, said wall space adapted to be filled by devitrified vitrifiable material of the self-crucible, said devitrified vitrifiable material being trapped in the wall space between at least part of said at least one of the plurality of separate projecting metal elements and a surface of the wall situated farther toward a periphery of the furnace than said part.

7. The furnace as claimed in claim 1, wherein the attachment texture comprises a horizontal belt fixed to the face of the metal plate and projecting away from the face of the metal plate, the horizontal belt extending along a periphery of the furnace and positioned at a distance between 5 cm and 20 cm inclusive from a bottom of the furnace.

8. The furnace as claimed in claim 1, wherein concrete covers the wall to form an interface with the self-crucible.

9. The furnace as claimed in claim 8, wherein the concrete contains more than 50% by weight of alumina.

10. The furnace as claimed in claim 1, wherein the wall extends along a vertical direction.

11. A method of producing a molten vitrifiable material comprising melting the vitrifiable material in the furnace as claimed in claim 1.

12. A method of producing the furnace as claimed in claim 1 comprising fixing texturizing elements onto a smooth face of a metal plate and then positioning the metal plate so that the smooth face provided with the texturizing elements forms the interior face of a wall of the furnace.

13. The furnace as claimed in claim 9, wherein the concrete contains more than 80% by weight of alumina.

14. The method as claimed in claim 11, wherein the molten vitrifiable material is molten glass and the vitrifiable material is glass.

15. The furnace as claimed in claim 1, wherein each of said plurality of separate projecting metal elements projects away from said face of the metal plate toward the interior of the furnace by a distance of at least 5 mm along a direction perpendicular to the wall.

16. The furnace as claimed in claim 1, wherein the plurality of separate projecting metal elements are fixed to said metal plate at different depths in the interior of the furnace to attach the self-crucible devitrified vitrifiable material.

* * * * *